UNITED STATES PATENT OFFICE.

CARL A. STETEFELDT, OF NEW YORK, N. Y.

PROCESS OF TREATING SULPHIDES.

SPECIFICATION forming part of Letters Patent No. 287,737, dated October 30, 1883.

Application filed June 21, 1883. (No specimens.)

*To all whom it may concern:*

Be it known that I, CARL A. STETEFELDT, a citizen of Germany, residing at New York, in the county and State of New York, have invented new and useful Improvements in Processes of Treating Sulphides, such as those obtained from the lixiviation of silver ores, of which the following is a specification.

In the lixiviation of silver ores by means of a hyposulphite solution the silver is obtained as sulphide of silver, ($Ag_2S$,) mixed more or less with sulphide of copper (CuS) and sulphide of lead, (PbS.) It is of advantage that the lead is precipitated as carbonate of lead ($PbCO_3$) previous to the precipitation of the silver by sulphide of natrium ($Na_2S$) or pentasulphide of calcium, ($CaS_5$,) so that the sulphides consist only of $Ag_2S$ and CuS. The mode generally practiced of converting these sulphides into bullion is to roast them and then melt the roasted mass with scrap-iron in crucibles. This method has several disadvantages: first, the necessity of drying the sulphides; second, the loss in silver by volatilization in roasting; third, the formation of a by-product of copper matte rich in silver.

The object of my invention is to obviate these disadvantages.

In carrying out my invention, I prefer to proceed as follows: The sulphides—such as $Ag_2S$, CuS, and PbS, when such are present—are collected by means of a filter-press, and the wet cakes, without previous drying, are placed into a vessel made of hard lead or other suitable material. Here they are treated with dilute sulphuric acid under addition of nitrate of soda, ($NaNO_3$,) whereby both silver and copper are easily dissolved. From the solution cement silver is precipitated by metallic copper, and finally sulphate of copper ($CuSO_4$ $+5ag$) is produced by crystallization. The lead, if such is present, remains insoluble, ($PbSO_4$.) If any gold is present in the sulphides it will remain undissolved together with a slight amount of silver chloride (AgCl) resulting from chlorine contained in commercial sulphuric acid and in sodium nitrate. When solution of the metals takes place nitric oxide (NO) escapes, which, in contact with air, forms yellow-red fumes by taking up oxygen, and becomes nitric peroxide, ($NO_2$.) If $NO_2$ is brought in contact with a slight amount of water it decomposes into nitric acid ($N_2O_5$) and nitrous acid, ($N_2O_3$.) Again, $N_2O_3$ in contact with more water is partially decomposed into $N_2O_5$ and NO, so that the final result of a mixture of NO air and water is a solution of $N_2O_5$ and $N_2O_3$. Both these acids are ready to part with oxygen under evolution of NO. This reaction is utilized in the manufacture of sulphuric acid ($H_2SO_4$) from sulphurous acid, ($SO_2$.)

Now, if the sulphides above named are dissolved in a closed vessel provided with a pipe through which the NO escapes, and this pipe is connected with a suitable apparatus where the NO is mixed with air and water $N_2O_5$ and $N_2O_3$ are regenerated, and these acids, together with dilute sulphuric acid, can serve for oxidizing and dissolving fresh portions of sulphides *ad infinitum*. As a suitable apparatus for this purpose a tower may be used which is built of bricks saturated, while hot, with coal-tar, and which is filled with coke. It is only necessary to introduce the NO pipe near the bottom of the tower and to connect with said tower at its bottom another pipe supplying a stream of air in proper proportion, while a spray of water from above keeps the coke moist and absorbs the acids $N_2O_5$ and $N_2O_3$. These acids accumulate at the bottom of the tower, whence they are pumped up and passed through the coke until they attain a proper concentration. The acids are then allowed to flow gradually into the closed vessel containing a mixture of the sulphides and dilute sulphuric acid, and the NO escaping is regenerated to $N_2O_5$ and $N_2O_3$ *ad infinitum*. It is only necessary to start with $NaNO_3$, and later on to make good any loss in $N_2O_5$ and $N_2O_3$, which cannot be entirely avoided in such an operation.

If desired, the operation can be started at once with nitric acid and dilute sulphuric acid; but $NaNO_3$ is much cheaper. So far as I know this peculiar reaction has never been utilized for the oxidation and solution of metals, and it must be remarked that my process is applicable to all sulphides which are not soluble in dilute sulphuric acid.

I am aware that it has been proposed to treat copper ores by grinding the same and afterward subjecting the same to sulphuric acid and nitric acid, as set forth in English patent No. 2,702, of 1860; and also that it has been proposed to treat base-metal bullion, as it comes from the retort in a granulated state, with a mixture of dilute sulphuric acid and nitric acid, as set forth in the patent granted to Frederick H. Bousfield, May 12, 1874, No. 150,675; but neither of those processes is my invention as herein described and claimed.

What I claim as new, and desire to secure by Letters Patent, is—

1. The process of treating sulphides, such as those obtained from the lixiviation process of silver ores, said process consisting in exposing said sulphides to the action of dilute sulphuric acid in the presence of nitrous acid and nitric acid, substantially as set forth.

2. The process of treating sulphides, such as those obtained from the lixiviation process of silver ores, said process consisting in exposing said sulphides to the action of dilute sulphuric acid in the presence of nitrous acid and nitric acid, and then regenerating the nitrous and nitric acid, substantially as described.

3. The process of treating sulphides, such as those obtained from the lixiviation process of silver ores, said process consisting in first exposing said sulphides to the action of dilute sulphuric acid in the presence of nitrate of soda, then converting the nitric oxide which escapes into nitrous acid and nitric acid, and finally carrying on the process by means of a mixture of nitrous acid and nitric acid with dilute sulphuric acid, substantially as set forth.

In testimony whereof I have hereunto set my hand and seal in the presence of two subscribing witnesses.

CARL A. STETEFELDT. [L. S.]

Witnesses:
W. HAUFF,
E. F. KASTENHUBER.